Sept. 17, 1946.   L. X. GARFUNKEL   2,407,924
FOOD SLICING MACHINE HAVING STATIONARY KNIVES AND A FOLLOWER FEED
Filed May 25, 1943   2 Sheets-Sheet 1
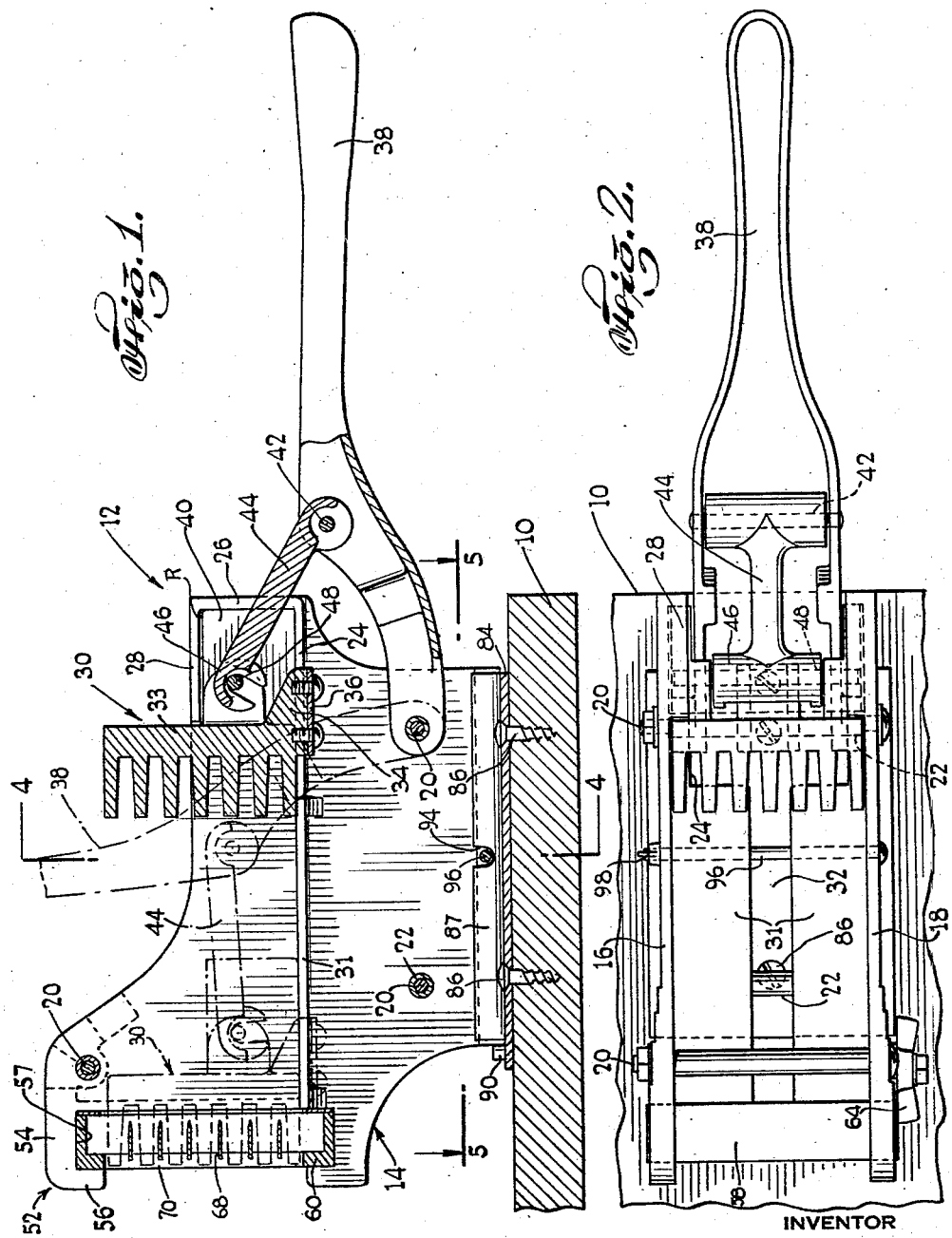
INVENTOR
Louis X. Garfunkel
BY
ATTORNEY Sept. 17, 1946. L. X. GARFUNKEL 2,407,924
FOOD SLICING MACHINE HAVING STATIONARY KNIVES AND A FOLLOWER FEED
Filed May 25, 1943 2 Sheets-Sheet 2
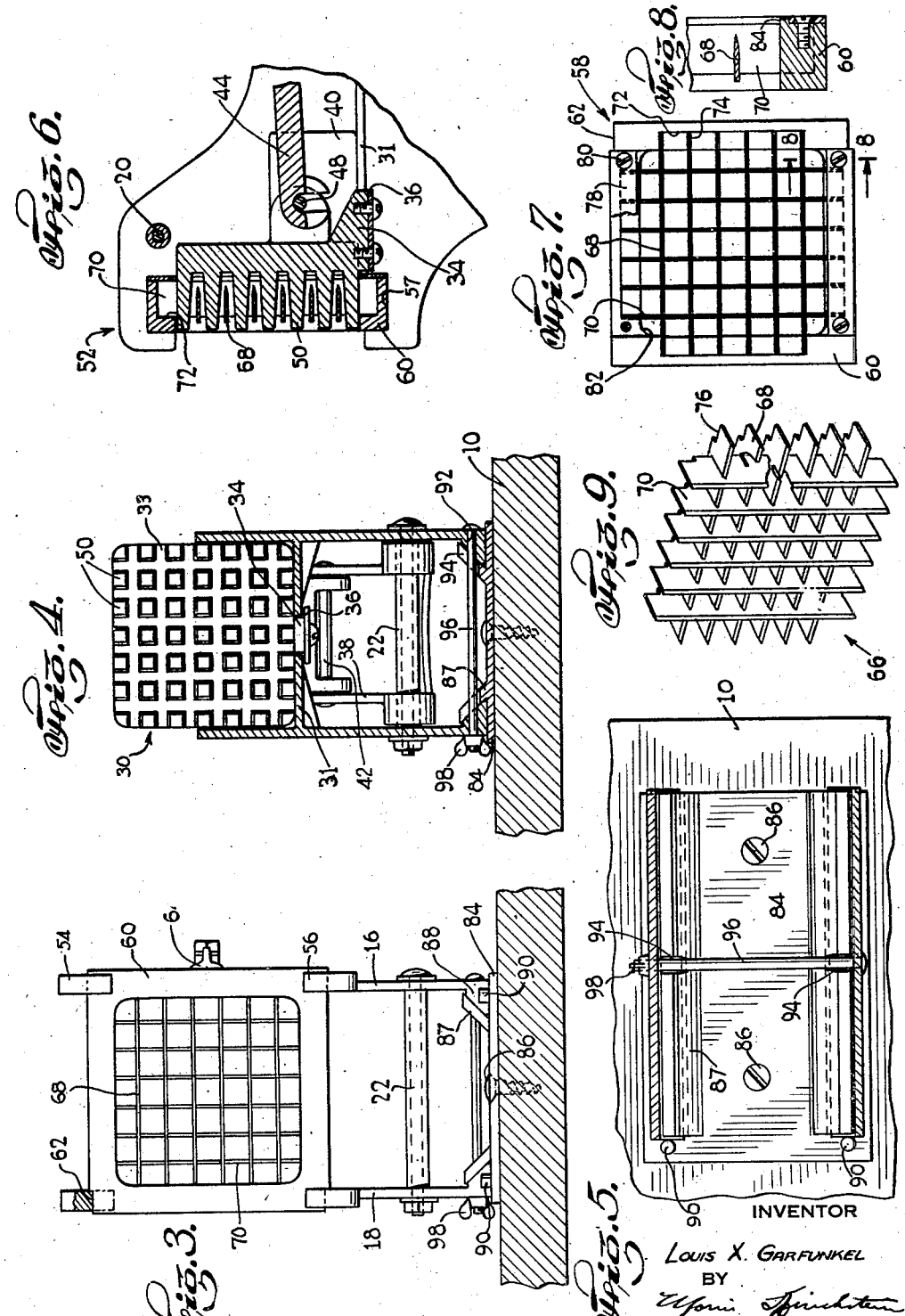
INVENTOR
Louis X. Garfunkel
BY
ATTORNEY Patented Sept. 17, 1946

2,407,924

UNITED STATES PATENT OFFICE 2,407,924

FOOD SLICING MACHINE HAVING STATIONARY KNIVES AND A FOLLOWER FEED

Louis X. Garfunkel, New York, N. Y.

Application May 25, 1943, Serial No. 488,366

6 Claims. (Cl. 146—169)

This invention relates to slicing machines and, more particularly, to culinary machines for cutting vegetables, such as potatoes, into elongated strips of uniform cross-section in preparing French fried potatoes and the like.

A machine of this general type is shown in my prior Patent No. 2,093,755, granted September 21, 1937, and the present invention is directed broadly to improvements in such machine for facilitating the assembly, mounting, operation, cleaning and maintenance thereof.

Certain of the improvements relate to the ram for pushing articles of food through the machine. In this connection, it is an object of the invention to provide a ram capable of forcing articles completely through the cutting unit, to prevent the ram from striking and thereby blunting or breaking the cutting edges, and also to provide a slidable mount for the ram which minimizes wear and facilitates removal of the ram from the machine.

Another object of the invention is to provide a cutting unit in which the knives are interlocked to form a rigid element capable of bodily separation from said unit and in which individual knives can be easily detached for sharpening.

A further object of the invention is to provide an improved mounting fixture for cooperation with the slicing machine which enables said machine to be securely and detachably fastened to a rigid support in either vertical or horizontal position.

An additional object of the invention is to provide an operative connection between the actuating handle and the ram which can be easily disengaged when the machine is to be disassembled for cleaning.

Other objects of the invention will in part be obvious and in part hereafter pointed out.

The invention accordingly consists in the features of construction, combinations of elements and arrangement of parts which will be exemplified in the construction hereafter described and of which the scope of application will be indicated in the appended claims.

In the accompanying drawings in which there is shown a culinary slicing machine embodying the improvements of the present invention, Fig. 1 is a longitudinal medial cross-sectional view through said machine;

Fig. 2 is a top plan view;

Fig. 3 is a front elevational view;

Figs. 4 and 5 are sectional views taken substantially along the lines 4—4 and 5—5 respectively of Fig. 1, and are illustrative of the improved mounting fixture;

Fig. 6 is a sectional view similar to Fig. 1 of the forward portion of the machine with the pusher ram at the end of its operative stroke;

Fig. 7 is a rear view of the cutting unit separated from the slicing machine and with a portion thereof broken away;

Fig. 8 is an enlarged sectional view taken substantially along 8—8 of Fig. 7 and shows the means for preventing the ram from striking the knife edges, and Fig. 9 is a perspective view, partly broken away of the interlocked and intersecting knife blades which form the rigid bodily removable cutting element.

Referring now in detail to the drawings, 10 designates a stationary support such as a counter, table, wallboard, stud or the like, adapted to support the slicing machine 12 embodying the invention.

Said machine comprises a frame 14 which consists of a pair of similar side walls 16, 18 held apart by a plurality of tie bolts 20 and spacing collars 22. Each of the walls has a longitudinal inwardly extending rib 24 which, at the rear of the machine, turns vertically upwardly, as at 26, and then forwardly, as at 28, to provide a shallow recess R which serves to limit the non-operative or retraction stroke of a pusher ram 30. At a point about one-quarter of the way from the rear of the machine, the ribs 24 are abruptly widened to form ram supporting plates 31 whose inner edges are spaced apart and define between them a slot 32 extending longitudinally of the machine. The plates afford a broad bearing surface for the ram over the major part of its throw thus minimizing wear and insuring long life for the machine.

The ram 30 consists of a heavy back wall 33 having a narrow rearwardly elongated pendant leg 34 which projects through the slot 32 and may be in sliding contact with the inner edges of the supporting plates 31. A strip 36 screwed to the bottom of the leg 34 is spaced from the base of the wall 33 a distance slightly greater than the thickness of the supporting plates 31 whereby said strip, leg and back wall 33 cooperate to form a crosshead which slidably and captively holds the ram on said plates. Sliding engagement between the sides of the ram and the side walls 16, 18 assist in preventing lateral shifting of said ram.

The machine is so proportioned that when the ram 30 approaches the end of its operative stroke, a ram actuating handle 38 enters between the side walls 16, 18 and abuts the ends of the supporting plates 31 (dotted line position of handle in Fig. 1) thus defining the end of said stroke, and it is for this reason said plates terminate short of the rear of the machine. However, owing to this construction, when the ram is fully retracted (full line position of handle in Fig. 1), the leg 34 and strip 36 clear the supporting plates, and it is, therefore, necessary to provide additional means for captively holding the ram in the machine and preventing the ram from tilting at the end of its return stroke. Such means may comprise a pair of spaced wings 40 extending rearwardly from opposite lateral edges of the ram and adapted to be received in the shallow recesses R. Abutment of the wings against the rib portion 26 operates to limit the return stroke of the ram.

The ram may be removed from the machine by sliding the same forward until the leg 34 and strip 36 clear the front edges of the supporting plates 31 immediately behind the cutting unit. As will later be seen, this can only be done after the operative connection between the ram and handle is disengaged and the cutting unit removed.

The handle 38 for reciprocating the ram is pivotally supported on rearmost of the lower spacing collars 22 and has a transverse fixed pin 42 spaced radially from the pivotal point of support. A link 44 is journalled at one end on said pin, and at its other end carries a cradle bearing 46 which straddles and rotatably receives a pin 48 bridging the ram wings 40. Said link is held in operative position simply by gravity and can be easily lifted when it is desired to slide the ram out of the machine.

The front face of the ram supports a plurality of horizontal, slender, forwardly extending tapering fingers 50 which may be of square cross-section and disposed in horizontal and vertical alignment, but whose shape and relative position is controlled by the arrangement and contour of the apertures in the cutting unit. These fingers serve to push the article to be sliced towards the cutting unit. Individually, by virtue of their size and arrangement, said fingers operate to force each slice of the article all the way through the cutting unit since at the end of a working stroke of the ram the tips of the fingers extend all the way through the apertures formed by the knife blades 68, 70 (see Fig. 6).

The forward ends of the side walls 16, 18 are vertically enlarged to form a slicing head 52 whose operative portion lies ahead of the front edges of the ram supporting plates 31. Said head includes a pair of forwardly extending hooked guides 54, on each side wall 16, 18. These guides have vertical inwardly extending lips 56 to provide a channel 57 into which a cutting unit 58 can be slidably received. Two of the guides 54 on one side wall, as, for example, the side wall 18, are vertically spaced slightly more than the corresponding guides on the other side wall 16 for a purpose presently to appear.

The cutting unit comprises a hollow frame 60 of generally rectangular shape which is designed to be slidably received freely in the channel 57. Two adjacent corners of the frame 60 have notches 62 formed therein to reduce the width of one side of the frame and permit this side to slidably enter between the two more closely spaced guides 54 on the side wall 16. The shorter faces of the notches abut against the latter guides 54, thus serving to limit insertion of the frame 60 in the slicing head 52 and define the operative position of the cutting unit 58. The latter is held in position by a wing nut 64 on the side wall 18 which is adapted to frictionally engage one flank of the frame 60 and press said frame against the guides on the opposite wall 18.

The cutting unit 58 includes a cutting element 66 which comprises a series of horizontal knife blades 68 and a series of vertical knife blades 70 transecting said horizontal knife blades. The horizontal knife blades are notched in alignment and at regular intervals along their cutting edges to receive and interlock with the rear edges of the vertical knife blades 70, thus forming a compact and rigid honeycombed cutting structure which defines a series of apertures of the shape and size into which it is desired to slice articles of food. The rear edges of the vertical knives may also be notched in alignment and at regular intervals so that a substantial degree of interlocking can be obtained without too greatly weakening either series of knives. It will be noted that the notches in the knives are not so deep as to permit the cutting edges of the vertical and horizontal knives, which face the ram, to lie in a common plane, since this would require too large a pushing effort when an article being sliced first contacted the cutting unit. It will be appreciated that although I have shown an arrangement such that the vertical knife blades first cut an article, this may be modified within the scope of my invention to permit the horizontal knife blades to start the slicing operation.

Each wall of the hollow cutting frame 60 is provided with a deep rearwardly facing inset 72 in which the ends 74 of the horizontal and vertical knives 68, 70 lie when the rigid cutting element 66 is seated in said frame. If desired, the front corners 76 of these ends may be notched to permit said element to set further into said frame, particularly where the overall depth of the element is substantial. Said element is detachably and firmly secured in the frame 60 by a pair of locking strips 78 which preferably are arranged to overlie opposite ends of knife blades of the same series as, for example, the ends of the vertical knife blades 70. The locking strips are held in position by screws 80 which engage tapped apertures in the cutting frame.

It will be appreciated that by constructing the cutting unit 58 in the foregoing manner, the cutting element 66 may be readily detached from the cutting unit to facilitate cleaning thereof and expedite replacement and resharpening of individual knife blades. It will also be seen that owing to my improved construction a single knife blade can easily be removed from the cutting element.

Means are also provided to guide the fingers 50 of the cutting ram immediately prior to the time that they enter the apertures in the cutting element 66, in order to prevent said fingers from contacting the cutting edges of the knife blades and dulling or otherwise impairing the same. Such means may comprise large corner fillets 82 on the hollow cutting frame 60 whose rear edges 84 lie behind the cutting edges of the most rearwardly disposed knife blades 70. These fillets are so arranged as to slidably engage the four corner fingers of the cutting ram, prior to the time that said fingers enter the apertures defined by the knives 68, 70. These four fingers, which function as guide shoes, have outer surfaces which are substantially parallel to the surfaces of the fillets 82. The outer surfaces of all the boundary fingers may likewise be parallel to the side walls 16, 18 and supporting plates 31 to increase the bearing surfaces subject to wear. However, the inner surfaces of the boundary fingers and the surfaces of all the remaining fingers are appreciably inclined or tapered so that the tips of the fingers are noticeably smaller than the aperture they are to enter, thus further minimizing possible interference between said fingers and the knife blades.

It may be mentioned that abutment of the handle 38 against the rear ends of the supporting plates prevents the back wall 33 of the ram from contacting the cutting edges of the knife blades 70.

Another feature of the invention resides in the means for rigidly and securely mounting the machine 12 in horizontal or vertical position in such manner that the machine cannot possibly come loose unintentionally. Such means may comprise a mounting fixture consisting of a base plate 84 which is fixedly held by screws 86 to a stationary object on which it is desired to support the machine. Said plate has two oppositely angularly inclined spaced parallel flanges 87, which, in conjunction with the portions of the base plate 84 adjacent the same, form spaced parallel triangular ways in which cuneiform ledges integrally extending from the bottom edges of the side walls 16, 18 are slidably received. Stops 90 at an end of the ways, limit insertion of the ledges. After the ledges have abutted against said stops, apertures 92 in said side walls and ledges are disposed in alignment with notches 94 in the flanges 87. An elongated bolt 96 passing through said apertures and lying in said notches prevents relative movement of the ways and ledges and thus locks the slicing machine on the mounting fixture. A winging nut 98 may be employed to prevent the bolt from slipping out. It will be appreciated that by using a mounting fixture, such as described, the machine can be firmly held in any desired position and will not work loose under any conditions although it can readily be removed for cleaning or repair.

It will thus be seen that I have provided a device which achieves the several objects of this invention and which is well adapted to meet the conditions of practical use.

As various possible embodiments might be made of the above invention and as various changes might be made in the embodiment above set forth, it is to be understood that all matter herein described and/or shown in the accompanying drawings is to be interpreted as illustrative and not in a limiting sense.

Having thus described my invention, I claim as new and desire to secure by Letters Patent:

1. In combination with a slicing machine frame on which is mounted a slicing machine head and a pusher ram reciprocable towards and away from said head, a mounting plate and cooperating means on said frame and plate to permit relative translatory sliding movement thereof in a direction parallel to that in which the ram reciprocates and to prevent movement in any direction transverse thereto, and means to optionally securely lock said frame and plate against such relative sliding movement in either direction.

2. A slicing machine of the character described comprising a frame, including at least two spaced walls having projections oppositely extending therefrom, a mounting plate having parallel oppositely facing slots, each of which is adapted to linearly slidably receive projections on one of said plates, and means to optionally securely lock said frame and plate against relatively sliding movement, said last named means comprising a rigid element passing through an opening in said frame and an opening in said plate.

3. A slicing machine of the character described comprising a frame, including at least two spaced walls having projections oppositely extending therefrom, a mounting plate having parallel oppositely facing slots, each of which is adapted to linearly slideably receive projections on one of said plates, and means to optionally securely lock said frame and plate against relatively sliding movement, said last named means comprising a bolt adapted to pass through an opening in the mounting plate, which opening runs into at least one of the slots, said bolt also being adapted to pass through an opening in at least one of said walls.

4. A slicing machine of the character described, comprising a frame, including a pair of spaced side walls; a cutting unit, including two series of relatively transversely disposed knives lying athwart said frame; a pusher ram; a pair of coplanar supporting plates extending inwardly from said side walls and defining a slot therebetween; a pendant leg on said pusher ram adapted to slide in said slot; an element attached to the tip of said leg and underlying said plates whereby said ram is slidably captively held to said plates; means to move said ram towards and away from said cutting unit; means to limit the retraction stroke of said ram; said leg and said element clearing said plates at the end of said retraction stroke; and means, independent of said plates, to prevent the ram from tilting in such position.

5. A slicing machine of the character described, comprising a frame, including a pair of spaced side walls; a cutting unit, including two series of relatively transversely disposed knives lying athwart said frame; a pusher ram; a pair of coplanar supporting plates extending inwardly from said side walls and defining a slot therebetween; a pendant leg on said pusher ram adapted to slide in said slot; an element attached to the tip of said leg and underlying said plates whereby said ram is slidably captively held to said plates; means to move said ram towards and away from said cutting unit; means to limit the retraction stroke of said ram; said leg and said element clearing said plates at the end of said retraction stroke; and means, independent of said plate, to prevent the ram from tilting in such position, said last named means comprising a pair of wings extending rearwardly from the back face of said ram and a recess in each of said side walls, each recess being adapted to receive one of said wings.

6. A slicing machine of the character described comprising a frame, a cutting unit, including two series of relatively transversely disposed knives lying athwart said frame, a pusher ram, means comprising a handle pivotally secured to said frame to move said ram in said frame towards and away from said cutting unit and means detachably interconnecting said handle and said ram, said last named means comprising a link permanently journalled at one end to said handle and having a cradle journal at its other end, and means on said ram adapted to be rotably received in said cradle journal, said cradle journal being maintained in operative engagement with said means by the weight of said link.

LOUIS X. GARFUNKEL.